Sept. 16, 1958  J. H. DOTTER  2,852,039
FLUID OPERATED VALVE
Filed June 20, 1955  2 Sheets-Sheet 1

John H. Dotter
INVENTOR.

BY Clarence A. O'Brien
and Harvey B. Jacobson
Attorneys

Sept. 16, 1958  J. H. DOTTER  2,852,039
FLUID OPERATED VALVE
Filed June 20, 1955  2 Sheets-Sheet 2
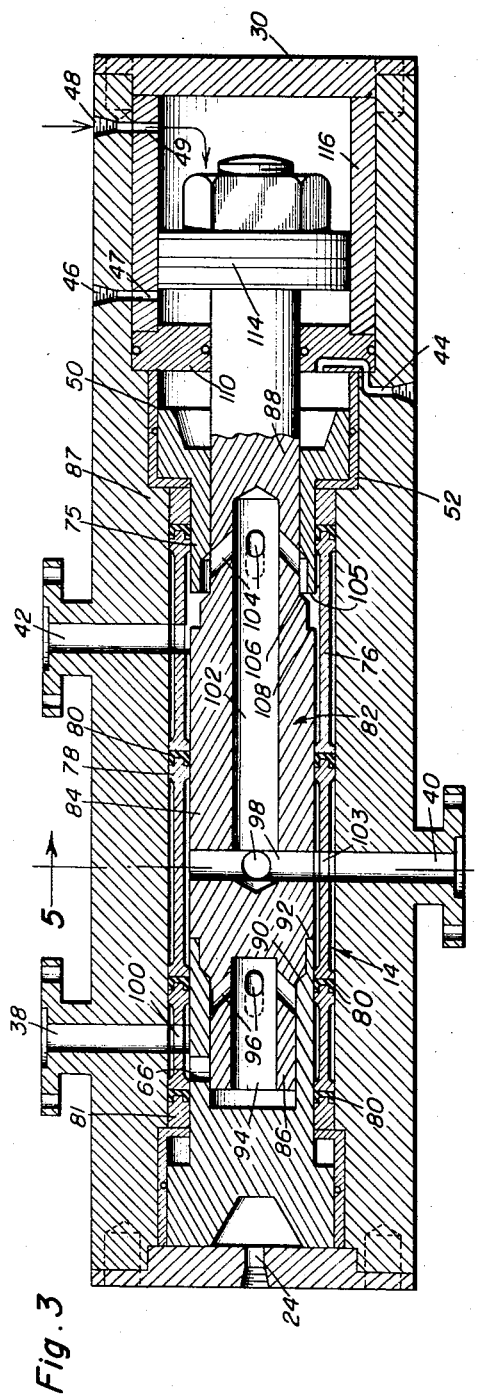
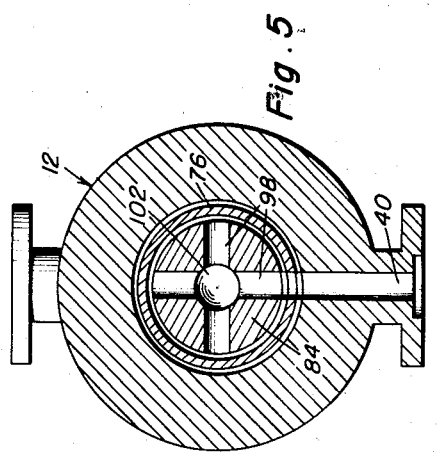
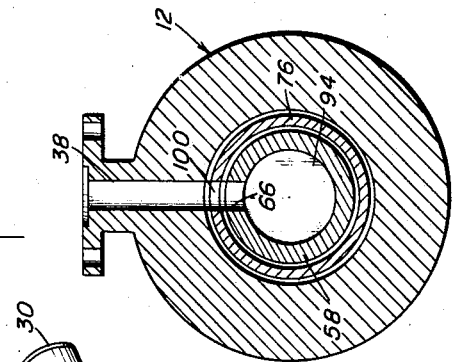
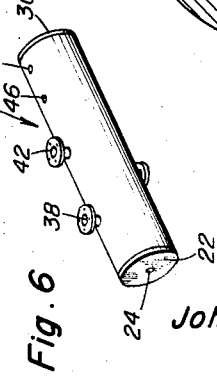
John H. Dotter
INVENTOR.

United States Patent Office 2,852,039
Patented Sept. 16, 1958

2,852,039

FLUID OPERATED VALVE

John H. Dotter, Baltimore, Md.

Application June 20, 1955, Serial No. 516,466

6 Claims. (Cl. 137—620)

The present invention relates to a valve construction and more particularly to fluid pressure operated valve assemblies.

The primary object of the invention is to provide a slide valve construction which, although not limited thereto, is particularly adapted for use with extremely high fluid pressures as in hydraulic presses, rams and similar hydraulic equipment, and wherein shocks are substantially entirely eliminated from its operation.

A highly important ancillary object of the invention lies in the provision of a single spindle, positioned midway between two floating valve seats and constituting therewith a double acting valve assembly.

Another object of the invention is to reduce or eliminate shocks arising from the seating of the reciprocating valve spindle by providing free floating valve seats to yield to and thereby cushion the seating movement of the valve spindle.

A further object of the invention is to assist in the elimination of shock in the operation of the valve by the provision of means for pressurizing the valve chamber on opposite sides of the movable valve seats whereby the valve spindle is ordinarily urged to a neutral position by the floating seats with the floating seats serving to close fluid passage through the valve spindle and consequently through the valve assembly.

An additional purpose of this invention is to provide a reciprocating valve assembly in which all contact of the valve spindle with stationary parts is eliminated.

A still further object of the invention is to provide a novel spindle operating means for a slide valve assembly whereby the spindle is operated by a piston with the creation of a pressure differential on opposite sides of the piston overbalancing the static pressure on one of the valve seats and consequently moving the spindle in either of its reciprocal directions.

The valve construction constituting the present invention includes a valve body having a valve chamber therein with a pressure responsive valve spindle with valve passages therethrough reciprocably disposed within the valve chamber and associated with movable valve seats. The valve seats are also slidably disposed within the valve chamber for a degree of movement less than the amount of reciprocal movement of the valve spindle whereby the fluid passages normally closed by the valve seats at opposite ends of the valve chamber are exposed as the spindle is moved between the limits of its reciprocal movement. Ports are provided in the end portions of the valve chamber to maintain the floating valve seats under static line pressure whereby the floating valve seats are generally urged toward one another thereby engaging the valve spindle and centering the spindle at its mid or neutral position within the valve chamber. To operate the valve in either its fluid passage or its exhaust cycles, a further pressure chamber is provided in the valve body and a piston disposed in this pressure chamber between a pair of pilot ports opening thereinto, the piston being in operative connection with the valve spindle whereby the valve spindle will be moved its reciprocal distance in either direction within the valve chamber upon the incidence of a pressure differential on opposite faces of the piston. This pressure differential on opposite faces of the piston causes the spindle to overcome the static line pressure against one of the floating seats urging the spindle in this direction. Inasmuch as the spindle is capable of a greater movement than either of the floating valve seats, one of the valve seats is unseated during this operation causing fluid passage through the valve. However, there is no shock in the operation inasmuch as the spindle seats against no stationary parts, the seating of the spindle being cushioned as pressure backs up on the floating valve seat which is moved with the spindle to gradually cushion the valve.

Thus, the valve spindle may be moved by a relatively light pressure in an easy manner with no shock resulting from the valve spindle seating against either of the floating valve seats the seats cushioning the valve spindle, and further without the necessity for the ports for the valve spindle fluid passages being passed over a spindle seat in the valve construction.

Further, it is a feature of the invention that fluid passing through the valve in both phases of the valve operation, namely the fluid passage phase and the exhaust phase is gradually decreased rather than suddenly stopped, by the nature of the floating valve seats and their coaction with the spindle during the reciprocal movement of the spindle.

Further, it is a further feature of the invention to utilize the floating valve seats as a means for returning the valve spindle to a neutral position in the absence of a pressure differential on the operating piston with the valve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a view similar to Figure 1, but of the valve assembly in position for the exhaust cycle of the valve;

Figure 4 is a cross-sectional view taken substantially along the plane of section line 4—4 of Figure 2;

Figure 5 is a cross-sectional view through the valve assembly taken substantially along the plane of section line 5—5 of Figure 3, and Figure 6 is a perspective view of the valve assembly.

Figure 1:
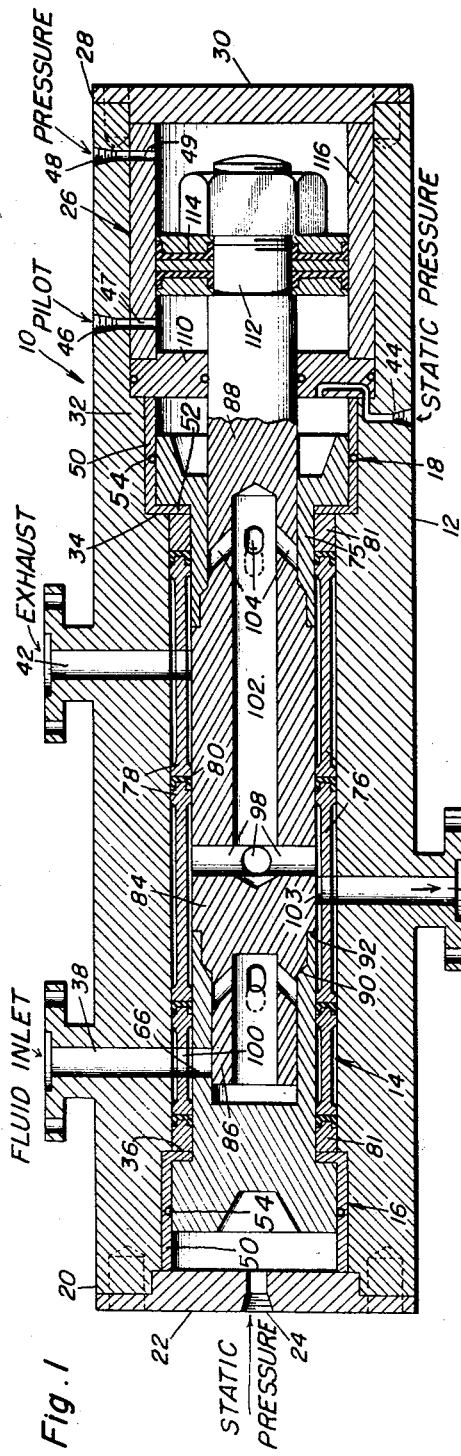
Figure 1 is a central longitudinal view in vertical section parts being shown in elevation, of one form of a valve construction embodying the principles of the present invention, the valve spindle being shown in a neutral position.

In the form of the invention depicted in the drawings, the valve construction designated generally by the numeral 10 includes a cylindrical or other suitably shaped elongated hollow valve body 12, provided with a longitudinal center bore or central valve chamber 14 therethrough opening at its opposite ends into enlarged counterbores 16 and 18.

The counterbore 16 opens directly into one end 20 of the valve body which end is closed by a suitable end plate 22 having a static line pressure port 24 opening thereinto.

The counterbore 18 at the opposite end of the central bore 14 opens into a yet larger counterbore 26 which counterbore in turn opens into the opposite end 28 of the valve body which end is closed by the end plate 30. Shoulder 32 joins the counterbore 26 and the counterbore 18 and shoulder 34 joins the counterbore 18 to the center bore 14 while shoulder 36 joins the counterbore 16 to the center bore 14.

Opening into the center bore 14 of the central portion of the valve bore and disposed at longitudinally spaced points along the valve body are fluid inlet port 38, fluid outlet port 40, and fluid exhaust port 42.

Static pressure port 44 opens into the counterbore 18 and a pair of pilot ports 46 and 48 respectively open at longitudinally spaced points therealong into the counterbore 26.

Basically, the diametrically reduced center bore 14 and the enlarged counterbores 16 and 18 may be said to constitute the valve chamber within the valve body with the counterbore 26 constituting a valve operating chamber. However, for the sake of convenience of description, the valve chamber consisting of the portions 14, 16 and 18 may be further broken down into a central valve chamber 14 and static pressure chambers 16 and 18, respectively.

A pair of sleeves or bushings 50, each having an inturned end 52 line the static pressure chambers 16 and 18 and are provided with internal sealing rings 54 intermediate the ends thereof and opening into the pressure chambers. The inturned annular flanges 52 abut the shoulders 36 and 34 and slidably disposed for limited reciprocal movement within the bushings 50 and between the inturned flanges 52 and the outer end of the static pressure chamber 16 is a member constituting a floating valve seat 56.

The floating valve seat 56 has a diametrically reduced sleeve end portion 58 which extends into the central portion of the valve chamber 14. The reduced end portion 58 of the floating seat 56 has a blind bore 60 opening axially into the end thereof, the outer end portion of the blind bore 60 being reamed out or counterbored as at 62 and joined to the central portion thereof by means of the tapered shoulder 64, the bore 60 being thus stepped and having a reduced inner portion and a larger outer end portion as at 62, the juncture of the portions being formed by the tapered shoulder 64.

A transverse bore 66 opens into the inner end portion or opens into the blind bore 60 adjacent the base thereof for admitting fluid thereinto during the operation of the valve through the fluid inlet portion 38.

A second member comprising a floating valve seat identical in structure to the floating valve seat 58 is designated by the numeral 68 and is slidably disposed within the bushing in the static pressure chamber 18 at the opposite end of the valve chamber 14. The valve seat 68 is slightly larger in diameter than the valve seat 66 and is provided with an axial, longitudinal bore 70 extending completely therethrough. At the inner end thereof the bore 70 is provided with an enlarged counterbore 72 merging into the balance of the bore by virtue of the tapered shoulder 74, the counterbore 72 being in facing relation to the counterbore 62 of the valve seat 56. The reduced stem portion 75 of the valve seat 68 of course extends into the valve chamber 14.

Lining the central valve chamber 14 are a plurality of sleeves 76, the end portions of the sleeves being enlarged as at 78 so that the sleeves are actually spaced from the wall of the bore except at their ends. The sleeves are disposed in end to end relation with the mating enlarged ends of the sleeves being suitably tongued and grooved and retaining sealing rings 80 therebetween. Collars 81 abut the endmost sleeves 76 and space them from the annular flanges of the bushings 50 disposed in the static pressure chambers 16 and 18, respectively.

Slidably disposed within the central valve chamber 14 of the valve body 12 and within the sleeves 76 is a valve spindle 82. The valve spindle 82 is of a generally cylindrical cross section having a diametrically enlarged central portion 84, sealingly engaging the sealing rings 80 within the central valve chamber 14, and terminates in diametrically reduced end portions 86 and 88 respectively. within the central valve chamber 14, and terminates in Reduced end portion 86 of the valve spindle 82 joins the enlarged central portion by virtue of stepped shoulders 90 and 92, respectively. Shoulder 90 is tapered to the same degree as shoulder 64 on the floating valve seat 56 and mates therewith while shoulder 92 is abutted by the end of the valve seat. The reduced end portion 86 of the spindle is slidably disposed and frictionally disposed within the blind bore 60. Opening longitudinally into the reduced end 86 is an axial fluid passage 94 which in turn opens into a plurality of fluid passage ports 96 in the reduced end 86 of the spindle 84 adjacent the tapered shoulder 90.

As will be noted from an examination of the figures of the drawing, the port 66 is always disposed between a pair of sealing rings 80 which straddle the fluid inlet port 38. Never in the operation of the valve does this port 66 pass beyond either of these straddling sealing rings.

The enlarged central portion 84 of the valve spindle 82 is provided with a plurality of transverse intersecting bores therethrough designated by the numeral 98, the ports of which are communicatable with a fluid inlet port 100 in a sleeve 76, and in further communication with a longitudinal passage 102 in the valve, this outlet passage 102 opening into a plurality of passages 104, the ports of which open into the reduced end portion 88 of the spindle. One of the sleeves 76 has a port 103 continuously in communication with the outlet port 40.

The reduced end portion 88 of the spindle 82 extends slidably through the bore 70 and the floating valve seat 68 and this reduced end portion 88 is joined to the enlarged central portion 84 of the valve spindle by virtue of the shoulders 106 and 108, the shoulder 106 being tapered to frictionally abut and seal against the tapered shoulder 74 of the seat 68 and the shoulder 108 abutting the reduced inner end of the seat 68. As will be noted, the passages 104 open into the side wall of the reduced end portion 88 of the spindle 82 adjacent the tapered shoulder 106.

A sealing partition 110 separates the operating chamber 26 from the static pressure chamber 18 and slidingly and sealingly projecting through this partition into the operating chamber 26 is the extreme end portion of the reduced inner end 88 of the valve spindle 82.

Carried by the extreme end portion 112 of the reduced inner end portion 88 of the valve spindle is an operating piston 114. Bushing 116 lines the operating chamber 26 and the operating piston 114 slidingly and sealingly engages this bushing which is retained against the partition 110 by the end plate 30.

The extreme end portion 112 of the spindle may be of reduced cross-section and joined to the reduced end portion 88 by means of a shoulder 120 and threaded as at 122 at the outer end thereof. Nut 124 threaded onto the outer end of the end portion 112 causes the piston 114 to abut the shoulder 120 and maintains the piston in place. The piston 114 is slidably disposed between the pilot ports 46 and 48 and the passages 47 and 49 aligned therewith in the bushing 116.

In the operation of the valve assembly, a constant pressure is provided against the valve seats 56 and 68 through the static line pressure ports 24 and 44, respectively. Normally, this pressure causes the seats 56 and 68 to press toward one another so that they seat against the opposite end portions 86 and 88 of the valve spindle 82 to close the spindle ports and press this valve spindle to the neutral position as shown in Figure 1 wherein the valve spindle passages 64, 98 and 102 are out of communication with the intake and exhaust passages of the assembly. To cause fluid passage through the valve, pressure is applied through the pilot port 46 in excess of the constant pressure against valve seats 56 and 68 without a corresponding pressure through the pilot port 48. This causes the piston 114 to move to the right drawing the spindle valve 82 with it.

Figure 2:
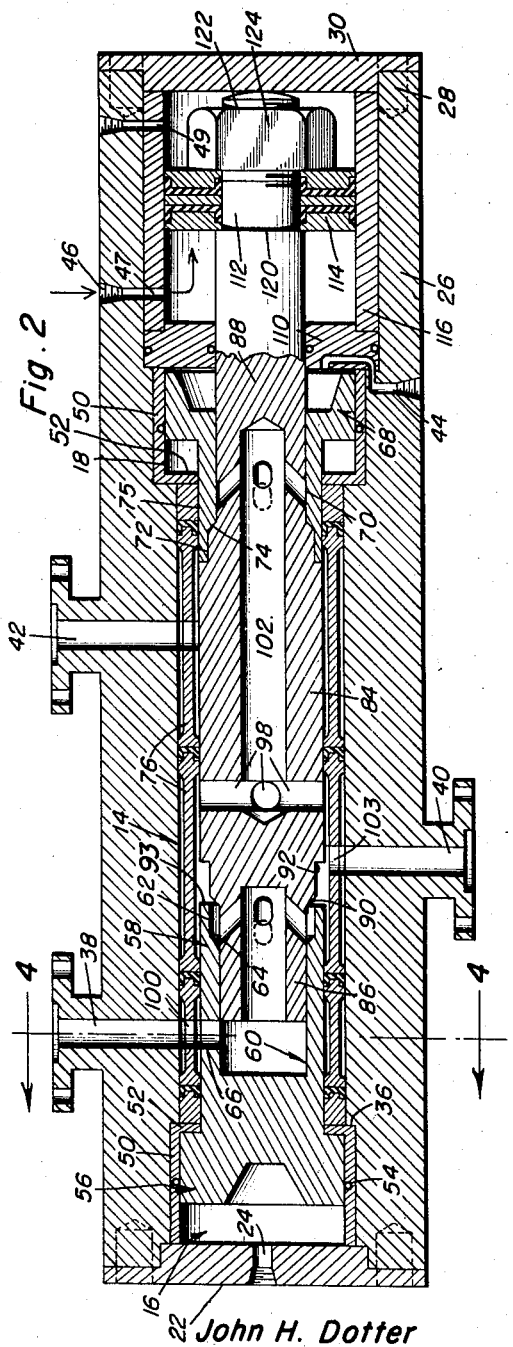
Figure 2 is a view similar to Figure 1, but with the valve in open position for passing fluid therethrough.

As the spindle is drawn to the right, the seat 68 tends to remain seated upon the end portion 88 of the valve spindle and cushions the movement of the valve in this direction by the resistance of the static pressure thereagainst as the seat moves in its chamber 18. At the same time, the seat 56 will abut the shoulder 52 and will be stationary wherein the end portion 86 of the spindle will slide relative thereto and will be freed so that fluid passage will be afforded between the fluid inlet port 38, passages 100, 66, 60, 94, 64 and the fluid outlet portion 40 as will be clearly evident from the position of these ports in Figure 2. It will be noted that during this operation, the spindle does not abut any stationary parts and requires very little pressure in its operation.

To exhaust the valve, fluid pressure is applied to the opposite face of the piston 114 through the incidence of pressure through the pilot port 48 and the absence of pressure through the pilot port 46. This causes the spindle to move to the left as shown in Figure 3 the static pressure at port 24 tending to retain the valve 56 seated upon the spindle end 86 and cushioning and limiting movement of the spindle in this direction by the build up of static pressure in the static pressure chamber 16. At the same time, by virtue of the reciprocable movement of the spindle being greater than the reciprocal movement of either of the seats, the seat 68 is unseated and a fluid passage is provided from the outlet port 40 through ports and passages 98, 102, 104 and the exhaust port 42. Again, it will be seen that the reciprocal limitative movement of the valve spindle in this direction is relatively shockless by virtue of the novel operation of the floating valve seats which float both with respect to the spindle and with respect to the valve chamber.

Further, it will be noted that as pressure is relieved from both of the pilot ports 46 and 48 so that the pressure on opposite faces of the piston are equalized, the static line pressure will cause the seats 56 and 68 to seat against the inturned flanges 52 of the chambers 16 and 18 and at the same time to seat against the tapered shoulders 90 and 106 of the valve spindle respectively thereby forcing the valve spindle to a neutral position centrally within the reduced valve chamber 14 intermediate the limits of its reciprocal movement. Thus, the pressure seat 56 and the exhaust seat 68 of the valve act as supplementary pistons to position the valve spindle in returning the valve to a neutral position. Any pressure fluid in the chambers located to the left of valve seat 68 and to the right of valve seat 56 (Figure 1) will pass by the leather packings on the reduced stem 75 in an amount sufficient to enable the valve to operate. Conventional vents for these chambers could be formed in the valve, should this be desired.

What is claimed as new is as follows:

1. In a valve construction including a valve body having an elongated valve chamber with a valve spindle reciprocably slidably disposed therein, means for reducing shock during the operation of the valve comprising floating valve seats disposed in said valve chamber adjacent opposite ends of the chamber, static pressure chambers in said body in which said seats are disposed, said seats forming partitions separating said valve chamber from said static pressure chambers, means to apply fluid under pressure to said static pressure chambers for normally urging said seats to seating position on said valve spindle, the limit of reciprocatory movement of said spindle being greater than the movement of either of said valve seats whereby one seat is unseated as the valve approaches each limit of its reciprocatory movement, ports in said valve body, and passage means in said spindle and said valve seats which coact with each other and said ports to control said ports in response to movement of said spindle and seats in said body.

2. In a valve construction including a valve body having an elongated valve chamber with a valve spindle reciprocably slidably disposed therein, said spindle having passages and said body having passages adapted to be registered therewith, means for reducing shock during the operation of the valve comprising floating valve seats disposed in said valve chamber adjacent opposite ends of the chamber, static pressure chambers in said body in which said seats are disposed, said seats forming partitions separating said valve chamber from said static pressure chambers, means to apply fluid under pressure to said static pressure chambers for normally urging said seats to seating position on said valve spindle and closing said spindle passages, the limit of reciprocatory movement of said spindle being greater than the movement of either of said valve seats whereby one seat is unseated as the valve approaches each limit of its reciprocatory movement so as to open the passages in said spindle, means for reciprocably moving said valve spindle from seating relation with said valve seats, ports in said valve body, and passage means in said spindle and valve seats which coact with each other and said ports to control said ports in response to movement of said spindle and seats in said body.

3. A shock resistant high pressure valve construction comprising a valve spindle having fluid passages therethrough, floating valve seats movably carried by said spindle closing said fluid passages, a valve body having a valve chamber reciprocably carrying said spindle and seats, stop means in said chamber for engaging each of said seats and limiting the reciprocal movement thereof to an amount less than the reciprocal movement of said spindle for opening said fluid passages in response to movement of said spindle, said body having static fluid pressure ports opening into said chamber to admit fluid into said chamber between each stop means and its associated seat for urging said seats into engagement with said stop means and for urging said spindle to an intermediate position in said valve chamber.

4. A valve assembly comprising a valve casing and a valve spindle reciprocable therein, means for reciprocating said spindle, passage means in said casing, said spindle having valve members spaced longitudinally thereof, cooperating passage means in said spindle and associated with said valve members for cooperation with said casing passage means, valve seat members free floating in said casing and having valve seats cooperating with said valve members for controlling flow through said spindle passage means, fluid pressure means yieldingly urging said valve seat members into seating engagement with said valve members for reciprocation therewith and holding said seat members in position to close said spindle passage means, means for limiting reciprocation of said valve seat members whereby they will be unseated from said valve members upon reciprocation of said spindle beyond a predetermined position in said casing and open at least a portion of said spindle passage means.

5. In a valve assembly including a valve body having an elongated valve chamber, a valve spindle mounted for sliding movement in said valve body, said valve chamber having enlargements at the opposite ends thereof, valve seats, said seats being disposed in said enlargements at the ends of said chamber and each valve seat including a head together with a cylindrical skirt, said head constituting a partition to separate said chamber into a central valve chamber and flanking static pressure chambers, said body having static pressure inlet ports on the outer sides of said heads in order to admit fluid under pressure into said static pressure chambers in order to press said valve seats onto the opposite ends of said spindle, said spindle having passages therethrough which open near said ends in order to be controlled by said skirts of said seats, said body having stops at opposite ends of said static pressure chambers in order to limit the extent of travel of said seats, and said skirts of said seats opening said passages when said spindle is moved slidably in said body whereby at least one of said seats is forced sufficiently to overcome the static pressure in its static pressure chamber.

6. The valve assembly of claim 5 wherein said spindle has shoulders near said ends on which said seats are normally rested by said static pressure in said static pressure chambers.

References Cited in the file of this patent

UNITED STATES PATENTS

| | | |
|---|---|---|
| 2,132,030 | Hunt | Oct. 4, 1938 |
| 2,469,921 | Hoge | May 10, 1949 |
| 2,503,827 | Langmore | Apr. 11, 1950 |
| 2,637,303 | Cintron | May 5, 1953 |
| 2,694,413 | Force | Nov. 16, 1954 |
| 2,706,467 | Houldsworth | Apr. 19, 1955 |

FOREIGN PATENTS

| | | |
|---|---|---|
| 15,604 | Great Britain | 1906 |
| 507,353 | Canada | Nov. 16, 1954 |